No. 761,272. PATENTED MAY 31, 1904.
A. WAGNIERE & G. W. VAN ALSTYNE.
COMBINATION TOOL.
APPLICATION FILED APR. 24, 1902.
NO MODEL.
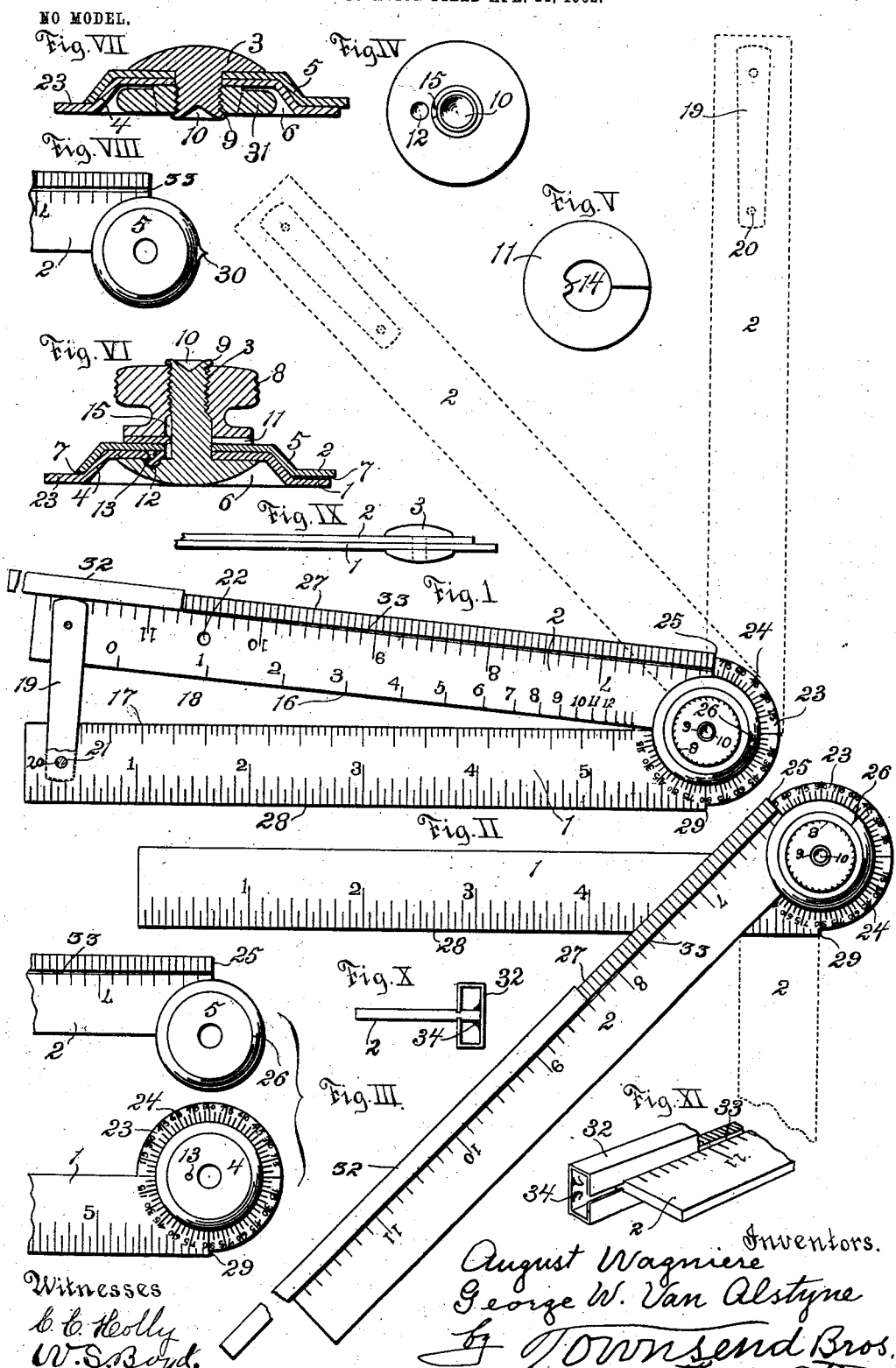

No. 761,272.                                               Patented May 31, 1904.

UNITED STATES PATENT OFFICE.

AUGUST WAGNIERE AND GEORGE W. VAN ALSTYNE, OF LOS ANGELES, CALIFORNIA.

COMBINATION-TOOL.

SPECIFICATION forming part of Letters Patent No. 761,272, dated May 31, 1904.

Application filed April 24, 1902. Serial No. 104,550. (No model.)

*To all whom it may concern:*

Be it known that we, AUGUST WAGNIERE and GEORGE W. VAN ALSTYNE, both citizens of the United States, residing at Los Angeles, in the county of Los Angeles and State of California, have invented a new and useful Improvement in Combination-Tools, of which the following is a specification.

Our invention relates to combination-tools, and more particularly to that class of instruments used for measuring sizes and angles.

The object of our invention is to produce a tool of but few parts, which can be secured together with sufficient rigidity to secure perfect accuracy, but which may be quickly loosened and reset for any of its many uses.

A further object is to construct a wire-gage that can be readily collapsed into a compact and desirable form for carrying in the pocket.

With these and other objects in view the invention consists, broadly, in so constructing and securing two members together as to form a wire-gage, a square, a bevel-square, and a protractor; and it consists specifically in the improved construction and novel arrangement of the parts of a combination-tool as will be hereinafter more fully set forth.

The accompanying drawings illustrate the invention.

Figure I is a plan view of one form of our improved gage, protractor, and square, the full lines showing it as a gage and the dotted lines as a protractor and square. Fig. II is a similar view with the parts differently positioned and used for a protractor and a square. Fig. III is a plan of the legs separated, the legs partly broken away. Figs. IV and V are plan views of the bolt and washer, respectively. Figs. VI and VII are sectional views of the joint. Figs. VIII, IX, X, and XI are detail views. In Figs. I and II the movable flange is shown partially withdrawn and broken to avoid obscuring other parts of the view.

Referring more particularly to the drawings, 1 and 2 designate the two legs of our improved combination-tool, which are perforated and pivotally secured together at one end, as by means of a pivot 3. The legs are preferably each formed from a thin flat piece of suitable metal, and their pivoted ends are preferably provided with circular heads 4 and 5, respectively. These heads are preferably cupped or formed with slightly frusto-conical depressions or recesses 6, which fit one within the other and give a good broad bearing to secure accuracy in adjustment. By making the inner depression a trifle deeper than the outer one a slight space 7 is left between the edges of the head 4 and the base of the head 5, whereby any lost motion, as from wear of the parts, can be taken up by forcing the outer head down over the inner head. It will also permit of the heads being forced or wedged together with sufficient friction to prevent movement of the parts after they have been adjusted or set.

The pivot 3 is preferably in the form of a bolt with a thumb-nut the head of which is large and flat, so as to fit within the recess 6 of the lower leg and engage with the bottom of the recess with as large an area as possible, thereby securing a good strong clamp and at the same time causing the entire head to lie wholly within the recess to permit of the tool being placed flat upon a smooth surface. The nut of the bolt or pivot has a broad flat bearing-surface to correspond with the head of the pivot and rests against the upper surface of the depressed portion of the upper leg. The upper portion of the nut may be roughened or milled, as shown at 8, to enable the operator to secure a firm grip on the nut for tightening or loosening the pivot. The upper end of the bolt may be headed or slightly upset or spread, as shown at 9, after the nut has been screwed into place to prevent the removal and possible loss of the nut and also to form a limit in loosening the nut to reset the instrument, thereby avoiding the liability of moving the parts in turning the nut through more than a partial rotation or sufficient to loosen and tighten the nut. The upsetting is best done by slightly cupping the end of the bolt, as at 10, and then slightly spreading it apart by means of a blunt-pointed swage. A split or spring washer 11 of any suitable form may be placed between the bottom of the nut and the top of the recessed portion of the upper head 5, Fig. VI, to yieldingly hold the heads of the legs together when the nut is loosened for the purpose of adjustment. The bolt may be prevented from rotating in the perforations of the legs by providing its head with a shoulder, as a recess or depression 12, with which a shoulder, as a pin or projection 13, on the leg engages when the parts are assembled. By making the washer non-rotatable the rotation of the nut cannot swing the upper leg upon its pivot in tightening the nut to set the tool. One form of accomplishing this re-result is by providing the washer with a tongue 14, which fits within a longitudinal groove 15 in the side of the bolt.

When the tool is to be used as a wire-gage, as shown in Fig. I, the adjacent edges of the two legs are graduated, as shown at 16 and 17, one of which graduations is for indicating the sizes of the wire or other article being engaged or measured and the other side is graduated to indicate the fractional parts of an inch, as the thousandths, to indicate the diameter of the article. The free ends of the legs are held at the correct distance apart to form a V-shaped space 18 between the legs, within which the article to be measured is placed, and moved toward the apex of the space until it is engaged by the edges of both legs. If the article stops at one of the wire-graduations, it is called by the number indicating that size; but if it stops at a point upon either side of such graduation its size or diameter is read from the graduations upon the other leg, indicating the fractional parts of an inch, or its size can be read in parts of an inch at all times and the wire-graduations ignored. By combining these two features in a single instrument a very useful and convenient tool can be furnished to the workman without adding materially to its cost. In this connection means are provided for holding the legs in position for forming a wire-gage, said means normally permitting the legs to swing freely, but adapted to retain them in a definite position, to which they may be instantly adjusted and wherein their inner edges form an acute angle. One means for holding the legs in position to form a wire-gage is to pivotally secure a link 19 at one end to one leg and provide its opposite end with a shoulder, as a pin or projection 20, which is adapted to releasably engage with a stop or fit within a hole 21 in the end of the other leg of the instrument. The link is preferably located at or near the end opposite the pivot, so that if any slight play occurs at the ends of the link the extent of the angle between the legs will be but little affected thereby. The length of the link and the position of the pin and perforations relatively to each other are so proportioned or adjusted as to hold the legs at the desired distance apart. When the instrument is to be used for other purposes than as a wire-gage or is to be collapsed for carrying in the pocket, the free end of the link can be swung around onto the leg to which it is pivoted and be secured thereon by letting the pin enter a perforation 22. In its collapsed form the wire-gage is smooth and compact and has no V-shaped angle liable to catch upon things carried with it in the pocket. By forming the link from a thin flat strip of spring metal the pin will be yieldingly held in either perforation against accidental displacement.

In adapting the instrument for use as a protractor or square the head of the lower leg is preferably flattened beyond the recessed portion, as at 23, and graduated, as at 24, with marks and numbers to indicate the degree of a circle, the graduations extending round a complete circle, and the head of the upper leg is provided with one or more indicators, as a shoulder 25 or mark 26. In practice we have found it very convenient to use only the numbers indicating ninety degrees or the quarter of a circle. This will necessitate using the same numbers four times, and we prefer to arrange the numbers on the opposite halves of the circle as duplicates of each other and also to arrange the numbers of any two adjacent quarters to increase or decrease in opposite directions from a common point. In the drawings we have shown two zero-points diametrically opposite each other and on a direct line with the inner edge of the leg 1 and two ninety-degree points diametrically opposite each other and each midway between the zero-points. The numbers on the end or outer portion of the head read in each direction from zero upward, as "15," "30," "45," &c., and those upon the inner portion begin at that zero-point and run in the same order in each direction toward the ninety-degree marks at the sides of the heads. When two indicators are used, they are preferably located at ninety degrees or at a quarter of a circle apart, which will permit of the readings being made from the mark that is most convenient to the operator. The shoulder 25 extends out over the scale, and by arranging it at right angles to the inner edge of the leg 2 it will normally stand directly over the ninety-degree mark when the instrument is closed, while the mark 26 will point to the outer zero-mark. As the legs are swung on their pivots the two indicators will move over the scales in such manner that the numbers adjacent to one of them will be increasing, while those adjacent to the other one will be decreasing, or vice versa. The inner edge of each of the legs is parallel with the outer edge and also on a direct radial line with the center of the pivot, which will cause the inner edges to contact throughout their entire length when the instrument is closed and will also cause the two outer edges to lie parallel with each other. It will also permit of either edge being used for the purpose of drawing or measuring angles, thereby enabling the instrument to be used as a protractor in the ordinary manner, or, as by crossing the legs, as shown in Fig. II, and also to measure inside or outside angles by placing the instrument upon or within the angle to be measured, as the angle can be read upon the protractor-scale in one instance as easily and correctly as in the other. In either case the instrument can be used as a square by swinging the legs at right angles to each other, as indicated in dotted lines in Figs. I and II, or as a bevel-square when the legs stand at other than right angles to each other.

To increase the utility of the instrument the outer edges of the two legs may be provided with graduations to indicate inches and fractional parts thereof, as indicated at 27 and and 28. This will enable the legs to be used as a rule, either separately or together, as when the two legs are swung into line with each other. To prevent the inch-scale on the leg 1 from interfering with the protractor-scale, the head 4 is preferably made with a radius a trifle less than the width of the leg, whereby a shoulder 29 is formed at the ninety-degree mark on the head of the scale. This will prevent the marks of the two scales conflicting with each other to such an extent as to be confusing. To cause the outside edges of the legs to lie in the same plane or in a line with each other when the legs are extended into a straight line, the shoulder 25 of the leg 2 is extended beyond the edge of the head 4 the same distance that the shoulder 29 projects from it. The shoulder 29 is preferably formed at one of the inch-graduations, and thus facilitates its use as a rule, as the shoulder can be placed at the point from which the measurement is to be made.

Instead of constructing the parts as above described it is evident that changes and alterations may be made without departing from the spirit of our invention. For instance, the link can be omitted when it is not desired to adapt the instrument for use as a wire-gage, or the depression 6 might be omitted and the two heads could be perfectly flat and clamped together by the pivot-bolt, as shown in Fig. IX, and one of them could be provided with a pointed indicator 30, as in Fig. VIII, in position to sweep around the protractor-scale, or the pivotal bolt may be reversed, and the nut 31 can be an ordinary wing-nut and be seated within the recess in the lower leg, as shown in Fig. VII, or one of the legs, as 1, could be provided with a flange 32, as shown in Figs. X and XI. Said flange has on one or both sides of the leg an inner shoulder, which projects laterally and at a right angle to the side of the leg to engage with the edge of a table or other object and increase the efficiency of the instrument when used as a bevel or try square. The flange is preferably made removable, as by providing one or both sides of the leg with a longitudinal groove 33, within which the edges of the flange fit, and prevent the lateral movement of the flange from off the leg. The flange is preferably formed by doubling or folding the edges of a strip of metal over toward each other until they nearly touch and at a sufficient distance from the back to permit of their entering the groove in the leg. The flange is substantially rectangular in cross-section, and the edges are far enough from the back to give stability when in position, and the back is provided with suitable means, as slight projections 34, for engaging with the edge of the leg and holding the flange at a right angle to the leg. The groove is preferably formed to the rear of the shorter graduations on the leg, but not the longer ones, thereby causing all of the graduations to appear between the groove and the edge of the leg, but only the longer ones appearing beyond the groove. By constructing the parts in this manner the flange can be easily put on or taken off the leg at any time, and it can be placed in position either end forward and either edge up. The flange is preferably formed from thin spring metal, so that by having the edges stand normally closer together than the thickness of the leg to be placed between them when the flange is in position the edges will be sprung slightly apart and will thereby engage with the leg by frictional contact. If desired, it can be made shorter than the leg, so that when it is in position the instrument can be used as a bevel-square when the legs are crossed without the inclined leg coming in contact with the end of the flange, or the flange can be partly removed to permit of this use of the instrument.

As above described, it is evident that our improved combination-tool can be quickly and cheaply formed, as the legs can be stamped from suitable sheet metal, recessed, perforated, and graduated, complete and then be secured together with a single pivotal bolt, with the addition of a spring-washer at the pivot and a link at the other end. It is so simple that it can be quickly changed to adapt it for any one of its varied uses and then be used by any operator. It is light and will take up but little room, and being adapted to so many uses and so easily changed that it forms a very convenient and desirable instrument for mechanics and others whose work requires the use of such a tool.

Having described our invention, what we claim, and desire to secure by Letters Patent of the United States, is—

1. A combination-tool comprising two graduated legs revolubly secured together at one end, each leg being provided at its pivotal end with a circular head arranged to revolve on the other, one head being provided with a complete circle of graduations and the other one with means for indicating degrees of said circle and means to connect the free ends of said legs for holding them apart.

2. A combination-tool comprising two legs pivotally secured together at one end, each leg being provided at its pivotal end with a circularly-dished head arranged to revolve on the other, one head having a flattened portion and provided with a complete circle of graduations, and the other head being provided with means for indicating degrees of said circle.

3. A combination-tool comprising two legs pivotally secured together at one end, each leg being provided at its pivotal end with a recessed circular head, the recessed portions being frusto-conical and fitting one within the other, one of the heads having a flattened portion and being provided with a complete circle of graduations around the recessed portion, and the other head being provided with means for indicating degrees of said circle.

4. A combination-tool comprising two legs pivotally secured together at one end, each leg being provided at its pivotal end with a recessed circular head, the recessed portions being frusto-conical and fitting one within the other, the bottom head having a flattened portion and provided with a complete circle of graduations around the recessed portion, and the upper head being provided with means for indicating degrees of said circle and recessed to a less depth than the bottom head, whereby a space is formed between its edge and the base of the other head and means for forcing said heads together.

5. A combination-tool comprising two legs pivotally secured together at one end, each leg being provided at its pivotal end with a circularly-dished circular head arranged to revolve on the other head, one head being provided with a complete circle of graduations and the other one with means for indicating degrees of said circle, the graduations being divided into four equal parts and numbered, the numbers on any two adjacent quarters being arranged in the same order in opposite directions from a common point.

6. A combination-tool comprising two legs pivotally secured together at one end, each leg being perforated at its pivotal end and provided with a recessed circular head, said heads fitting one within the other, a bolt through said perforations, the head of which is flat and fits within the recess of the inner head, a nut on the bolt, and a spring-washer between the nut and the top of the recessed portion of the outer head.

7. A combination-tool comprising two legs pivotally secured together at one end, each leg being perforated at its pivotal end and provided with a recessed head, said heads fitting one within the other, a bolt through said perforations, the head of which is flat and fits within the recess of the inner head, the opposite end of said bolt being cupped and swaged, a nut on the bolt, and means for holding the heads together yieldingly.

8. A combination-tool comprising two legs pivotally secured together at one end, each leg being perforated at its pivotal end and provided with a recessed head, said heads fitting one within the other, a longitudinally-recessed non-rotatable bolt through said perforations, the head of which fits within the recess of the inner head, a nut on the bolt, and a spring-washer between the nut and the upper head and provided with a tongue to fit within the groove of the bolt.

9. A combination-tool comprising two legs pivotally secured together at one end, each leg being perforated and provided at its pivotal end with a recessed head, said heads fitting one within the other, and one of them being provided with a projection, a bolt through said perforations, the head of which fits within the recessed head and is recessed for the reception of said projection, a nut on the bolt, and a non-rotatable washer between the nut and the upper head.

10. A combination-tool comprising two legs pivotally secured together at one end and provided with protractor-markings near the pivotal point, one of the legs being grooved longitudinally near one edge, and a flange rectangular in cross-section removably secured upon said leg, the inner edges of the flange being folded over toward each other so as to form lateral projections on each side of the leg and adapted to engage with the grooved portion of the leg.

11. A combination-tool comprising two legs pivotally secured together at one end, and a longitudinally-movable flange removably secured on one of the legs, the edges of the flange being folded over toward each other and the back being provided with projections for engaging with opposite sides of the leg.

12. An attachment for squares comprising a removable flange, the edges of which are folded toward each other and normally stand at a distance from each other and from the back, and the back being provided with projections for engaging with the sides of the leg and holding the flange at right angles to the leg when the attachment is in position.

In testimony whereof we have signed our names, in the presence of two subscribing witnesses, at Los Angeles, county of Los Angeles, and State of California, this 18th day of April, 1902.

AUGUST WAGNIERE.
GEORGE W. VAN ALSTYNE.

Witnesses:
W. S. BOYD,
F. M. TOWNSEND.